(No Model.)

C. J. APPLEQUIST.
ANTI-FRICTION HUB.

No. 446,409. Patented Feb. 10, 1891.

Witnesses.
Charles G. Hawley.
A. M. Gaskill

Inventor.
Charles J. Applequist.
By Paul & Merwin
Attorneys.

UNITED STATES PATENT OFFICE.

CHARLES J. APPLEQUIST, OF ELLENDALE, NORTH DAKOTA, ASSIGNOR OF ONE-HALF TO NELS T. HOLTE, OF SAME PLACE.

ANTI-FRICTION HUB.

SPECIFICATION forming part of Letters Patent No. 446,409, dated February 10, 1891.

Application filed November 25, 1890. Serial No. 372,627. (No model.)

*To all whom it may concern:*

Be it known that I, CHARLES J. APPLEQUIST, of Ellendale, in the county of Dickey and State of North Dakota, have invented certain Improvements in Anti-Friction Hubs, of which the following is a specification.

My invention relates to journal-bearings for wagon-hubs and fixed bearing-blocks; and its object is to provide a simple frictionless bearing which after once being put together will not under ordinary circumstances need to be taken apart or oiled. Heretofore anti-friction hubs have been provided with longitudinal frictional rolls provided between the axle and the inside of the journal-box. Such a device has been patented by me in Letters Patent No. 421,539, dated February 18, 1890.

My present invention is more especially an improvement over the device claimed in the above patent, in the practical use of which for wagon-hubs it has been found that the lateral thrust of the hub upon the axle is apt to make the hub-box bear against the stationary shoulder and nuts thereon with such force as to make the wheel hard to move. To obviate this difficulty I have conceived the idea of providing conical friction-rollers in the said shoulder and nut upon said shaft, in combination with the longitudinal rolls shown in my said patent. These conical rollers revolve upon axes corresponding to the radii of the containing-cup, and are adapted to allow the circular end of said hub-box to move freely and without friction against the said shoulder or nut when thrust against the same by the lateral movement of the wheel upon its axle.

My invention consists further in the novel construction of the roller-cup forming the shoulder and the nut on the axle.

Figure 1:
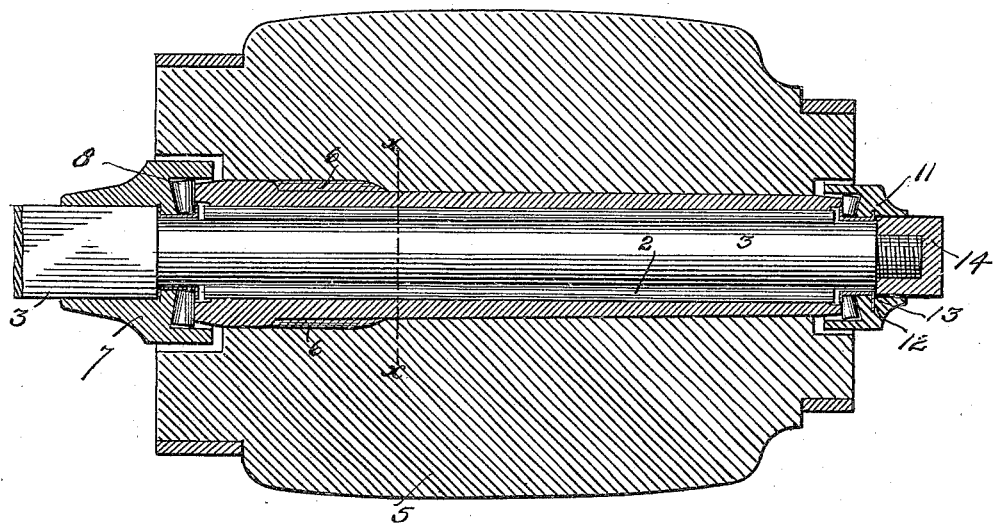
Figure 2:
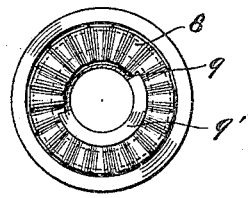
Figure 3:
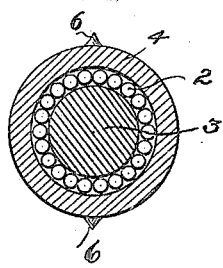
Figure 4:
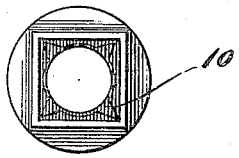

In the accompanying drawings, which form a part of this specification, Figure 1 is a longitudinal section of an anti-friction bearing embodying my invention. Fig. 2 is an inside view of one of my friction-roller cups. Fig. 3 is a sectional view of the shaft journal-box and friction-rolls, slightly enlarged and taken upon the line *x x* of Fig. 1. Fig. 4 is a view of the combination friction-roller-cup nut upon the outer end of the axle, the nut being removed.

As shown in Fig. 1, the friction-rolls 2 are provided about the shaft 3 and between the shaft and the box 4 of the hub 5. This box 4 is permanently secured in the hub, and is held in place by the projections 6. The shoulder-cup 7 is provided on the square portion of the axle, as shown, and is provided with the requisite number of the cone-shaped friction-rollers 8. These friction-rollers are held in place in the cup 7 by the circular band 9 and the flange 9' on the outer edge thereof. This band or sleeve 9 is held in place by turning over the inner edge thereof upon the shoulder abutting against the square portion of the axle 3, in the manner shown by the points 10 in Fig. 4. A similar cup 11, provided with similar conical rollers, is provided on the outer end of the axle 3, the points 12 of the retaining-sleeve thereof being turned down upon the shoulder 13, against which the square nut 14, corresponding to the square portion of the axle over which the cup 7 is slipped, presses. The ends of the hub are preferably bored out, as shown, to receive the inner end of the cups, while the hub-box 4 is of such length that the ends thereof extend out into these openings and into the said cups.

In the practical application of my invention the whole device is so proportioned that the hub-box has considerable play between the cups 7 and 11 and their frictional rollers that the hub has considerable lateral play upon the axle 3. Hence if the wheel is running perpendicularly upon the ground practically there will be no engagement between the ends of the box 4 and the rollers in the cups 7 and 11; but if, for instance, the wagon should be on a side hill the wheel would be pressed in or out, as the case might be, against the nut or shoulder upon the axle, thus bringing the annular end of the hub-box with some force against the frictional rollers in the cup.

I have shown and described my invention as applied to the hub of a wheel with its axle. It is obvious, however, that the hub could be made a stationary bearing and the axle or shaft allowed to rotate therein. There are also various modifications of my invention which would readily suggest themselves to one skilled in the art, and I therefore do not confine myself to the specific construction shown and described.

I claim as my invention—

1. In an anti-friction hub or bearing, the journal-box adapted to receive the stationary or movable shaft and the longitudinal friction-rolls between said shaft and the inner surface of said box, with the cone-shaped friction-rolls provided in the cups, said cups being fixed on said shaft against rotation thereon and adapted to limit the lateral play of said journal-box or of the said shaft upon one another, respectively, substantially as shown and described.

2. The combination of the journal-box adapted to rotate upon a suitable shaft through the medium of friction-rolls, with containing-cups secured to said shaft and provided with cone-shaped rollers revolving in an annular groove therein, said rollers adapted to engage with the annular end of said journal-box when the said journal-box is thrust longitudinally upon the said shaft into said cup, whereby the friction between the end of the journal-box and the limiting-stop to which the said containing-cup corresponds is lessened.

3. The combination of a friction-roll cup adapted to be secured to a shaft or axle and provided with conical-shaped rollers in an annular groove or seat therein, said rollers being of such number as to just fill said annular groove and being loosely held therein by the flanged sleeve provided upon the inner surface of the opening through which the shaft enters, said sleeve being held in place by turned-down points provided upon the other end thereof upon the shoulder of the larger opening provided in the outer end of said cup for the accommodation of the large portion of said shaft or axle, substantially as and for the purpose specified.

4. The combination, in an anti-friction bearing, of the limiting-cups 7 and 11 provided upon the shaft 3, the friction-rolls 2, and the journal-box 4, with the conical-shaped rolls 8, provided in annular grooves in said limiting-cups and adapted to be held therein by the flanged sleeves 9 and 12 of said cups 7 and 11, and means for securing the cup 7 to the shaft 3 and for removably securing the cup 11 to the same, said journal-box 4 being somewhat shorter than the distance between the rolls in the boxes 7 and 11 and adapted to engage therewith, thereby lessening the friction tending to oppose the revolution of the said box 4 or the shaft 3, respectively, when the shaft is moved longitudinally in or upon the said box, substantially as shown and described.

In testimony whereof I have hereunto set my hand this 3d day of April, 1890.

CHARLES J. APPLEQUIST.

In presence of—
C. G. HAWLEY,
BESSIE BOOTH.